United States Patent
DeMeo et al.

(10) Patent No.: US 6,973,588 B2
(45) Date of Patent: Dec. 6, 2005

(54) DISASTER RECOVERY PORT IN A PORTABLE COMPUTER

(75) Inventors: Dana C. DeMeo, Lake Grove, NY (US); David Stern, Centereach, NY (US); Thomas Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 18 days.

(21) Appl. No.: 10/306,527

(22) Filed: Nov. 27, 2002

(65) Prior Publication Data

US 2004/0103341 A1      May 27, 2004

(51) Int. Cl.[7] ............................................. G06F 11/00
(52) U.S. Cl. ......................................... 714/6; 714/727
(58) Field of Search ............................ 714/6, 5, 7, 13, 714/30, 32, 42, 47, 726, 727, 43, 733

(56) References Cited

U.S. PATENT DOCUMENTS

| | | | |
|---|---|---|---|
| 5,828,825 A * | 10/1998 | Eskandari et al. ............ 714/27 |
| 5,869,979 A * | 2/1999 | Bocchino ..................... 326/38 |
| 5,970,005 A * | 10/1999 | Yin et al. ..................... 365/201 |
| 6,259,442 B1 * | 7/2001 | Britt et al. ................... 345/721 |
| 6,266,784 B1 * | 7/2001 | Hsiao et al. .................... 714/6 |
| 6,324,096 B1 * | 11/2001 | Tomita ................... 365/185.05 |
| 6,442,092 B1 * | 8/2002 | Tomita ....................... 365/219 |
| 6,629,268 B1 * | 9/2003 | Arimilli et al. ............... 714/42 |
| 6,643,796 B1 * | 11/2003 | Floyd et al. .................. 714/10 |
| 2002/0044484 A1 | 4/2002 | Tomita |

OTHER PUBLICATIONS

International Search Report, PCT/US03/35764, mailed Mar. 31, 2004.

* cited by examiner

*Primary Examiner*—Nadeem Iqbal
(74) *Attorney, Agent, or Firm*—Amin & Turocy, LLP

(57) ABSTRACT

An architecture for updating corrupted instructions in a computing device. The computing device includes a housing for enclosing a flash memory for storing a boot loader routine, and at least one boundary-scan device internal to the computing device for processing the boot loader routine, and operatively disposed on a boundary-scan bus. The housing includes a boundary-scan port through which updated instructions are communicated and power provided. The port is concealed under a label, cover, or in a location that limits access by the device owner, such as the battery well.

28 Claims, 6 Drawing Sheets

DISASTER RECOVERY PORT IN A PORTABLE COMPUTER

TECHNICAL FIELD

This invention is related to JTAG (Joint Test Action Group), or boundary-scan devices, and more specifically to accessing a JTAG device.

BACKGROUND OF THE INVENTION

Most portable computers contain a boot loader routine that facilitates software, updates to onboard flash memory. The boot loader typically resides within the onboard flash memory. On rare occasion, the software stored in flash memory of a handheld portable computer can be catastrophically corrupted, such that the boot loader is also corrupted. This condition prevents an external host from updating the corrupted flash memory. Under normal circumstances the portable computer must be dismantled, and the printed circuit board (PCB) installed onto a test fixture in order to restore the boot loader program. After the boot loader is restored, the remaining system software can be downloaded.

Additionally, there are typically programmable logic integrated circuits (ICs) on the PCB that generally can only be programmed via special programming pins—these pins are normally not externally accessible. Thus in order to update the programmable logic or recover from catastrophically corrupted software stored in the flash memory the product case must be opened. Opening of a product case is not only laborious and time consuming, but can lead to upsetting configurations/settings with respect to various components within a product as a result of the manual intervention thereof.

SUMMARY OF THE INVENTION

The present invention disclosed and claimed herein, in one aspect thereof, comprises architecture for updating corrupted instructions in a computing device. The present invention mitigates some of the aforementioned problems associated with physical intervention of a device in order to update corrupted instructions. The subject invention provides accessibility to a set of programming contacts from outside of a computer case for a device having instructions requiring update or correction. In accordance with one particular aspect of the invention, pin contacts are located underneath a label, recess, or other protective door of the device, and these contacts allow access to a set of signals by a technician that facilitate disaster recovery without requiring opening of a housing of the device.

One particular aspect of the invention provides for a computing device that includes a housing for enclosing a flash memory storing a boot loader routine, and at least one boundary-scan device internal to the computing device for processing the boot loader routine, and operatively disposed on a boundary-scan bus. The housing includes a boundary-scan port through which updated instructions are communicated and power provided. The port is concealed under a label, cover, or in a location that limits access by the device owner, such as the battery well.

In another aspect thereof, there is provided architecture for programming a boundary-scan device in a computing device. The boundary-scan device can be disposed on a boundary-scan bus within a housing of the computing device. The boundary-scan bus can be accessed through the housing, which is unopened, via a boundary-scan port for example to communicate program instructions thereacross to the boundary-scan device. An interface module can be interfaced to the computing device via the boundary-scan port for providing power and communicating the program instructions thereto. The interface module can interface in the computing device for example via a battery well of the computing device or via interface means exterior to the battery well.

In still another aspect thereof, there is provided a system for updating instructions in a computing device, the computing device comprising a housing for enclosing a memory for storing computer executable instructions, and at least one boundary-scan device internal to the housing and operatively disposed on a boundary-scan bus for processing the computer executable instructions. The system includes an interface module for interfacing to the computing device to communicate an updated version of the computer executable instructions thereacross for storing in the flash memory, and a control module in operative communication with the interface module. The control module can provide power to the computing device through the interface module while the instructions are being updated in the computing device. Alternatively, the interface module alone provides power to the computing device during the updating process by interfacing to the computing device via a boundary-scan port for providing power and communicating the program instructions thereto, the interface module interfacing to the computing device by at least one of in a battery well of the computing device and outside of the battery well.

In yet another aspect thereof, there is provided architecture for programming a computing device. The computing device includes a boot loader routine stored in a memory. In response to a boot loader routine stored in a memory becoming corrupted, accessing a bus through a port of the device to communicate an updated version of the boot loader routine thereacross for storing in the memory. The bus is at least one of a boundary-scan bus and a system bus. The port can be accessed through a housing of the device. The port can be a wireless communication port that is mechanically inaccessible through the housing.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
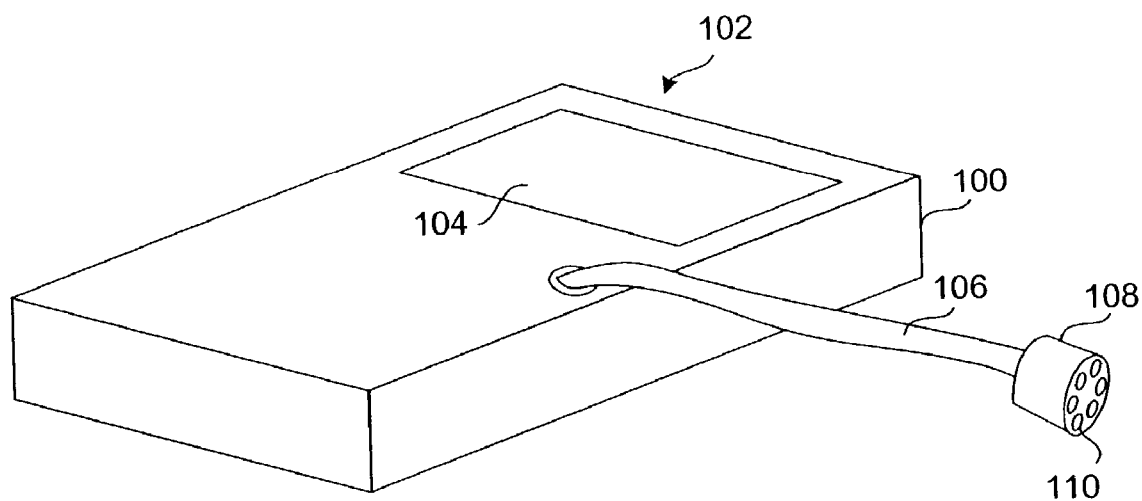
FIG. 1 illustrates an isometric of an implementation of the present invention in a recovery module that mates mechanically and electrically in a battery well of the recoverable computing device.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "module" are intended to refer to a computer-related entity, either hardware, a combination of hardware and software, software, or software in execution. For example, a computer component or module may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

As noted above, the present invention mitigates some of the aforementioned problems associated with conventional schemes for updating/correcting corrupted program(s) of a device by providing access to the program(s) from outside of a housing of the device. The external access to the program of the device mitigates the need to open the housing of the device that can lead to creating new problems with the device let alone the trouble and time associated with manually opening the device.

Most portable computers contain a processor with JTAG (Joint Test Action Group) debugging capabilities. JTAG is a consortium of North American chip companies that developed onboard chip input/output testing capabilities such that one or more chips of densely packed circuits can be tested through test access ports on a software-controlled basis. JTAG, also know as boundary-scan, was developed in the 1980s, and standardized in 1990 as the now defined IEEE 1149.1 standard, which allows full access to internal registers of a digital device. Typically, only five signal lines are needed in a boundary-scan interface to access the internal chip registers (e.g., TDI (test data in), TDO (test data out), TCK (test clock), TMS (test mode select), and TRST (test reset) in lieu of a power-up reset). Additionally, many programmable logic devices such as FPGAs (Field Programmable Gate Arrays) and CPLDs (Complex Programmable Logic Devices) use the JTAG architecture for programming and configuration. The JTAG also supports a daisy-chained topology. Thus substantially all microprocessors and a number of other devices, such as the CPLDs, can be included in a single JTAG chain. In this manner and in accordance with the subject invention, a technician can access most, if not all, of the chips in a computer digital system via the JTAG contacts (e.g., the five JTAG pins plus ground) without opening the device case to access pins and other ports.

FIG. 1 illustrates an isometric of an implementation of the present invention in a recovery interface module 100 that mates mechanically and electrically in a battery well of the recoverable computing device. As illustrated from the back side, the interface module 100 includes a battery compartment 102 enclosed with a battery compartment cover 104. The battery compartment 102 is provided where the application is such that an external power source cannot be utilized. Where the recovery operation can utilize an external power source, there is also provided a power and signal cable 106 for conducting power and communicating signals therethrough to the recovery module 100, and further to the recoverable device (not shown). The cable 106 includes an interface connector 108 having a number of power and signal pins 110 for interfacing power and signals to the recoverable device. The cable 106 exiting the interface module 100 connects to a JTAG control module (not shown) to interface signals therebetween. Instead of providing battery power from batteries onboard the interface module 100, the interface module 100 can be configured to route battery power directly to the battery system of the recoverable device.

It is appreciated that where the batteries of the module 100 are rechargeable, the module 100 can include a recharging circuit for recharging the module batteries. In this implementation, the cable 106 would then provide AC power to the charging circuit of the module 100. Alternatively, the charging circuit is in an external module such as the JTAG control module so that the batteries are charged therefrom. Where the module 100 includes the batteries, a computer service depot can more easily and quickly gain access to the internal digital logic for rewriting code in the programmable logic ICs without having to ensure that external power is made available. This configuration also facilitates operating in a field environment where the technician may need to go to the device instead of the device being brought to the depot for service.

Figure 2:
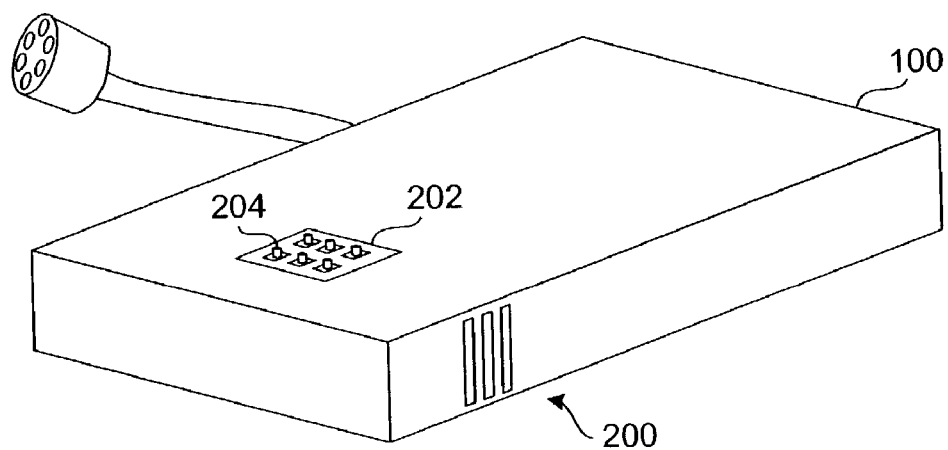
FIG. 2 illustrates a front side isometric of the recovery module of FIG. 1.

Referring now to FIG. 2, there is illustrated a front side isometric of the recovery module 100 of FIG. 1. The module 100 includes a battery interface connector 200 for conducting power to the recoverable device. The module 100 also includes a JTAG interface pin connector 202. The pin connector 202 includes a number of pins 204 for contacting a mating JTAG pad connector of the recoverable device. The types of pins 204 utilized can be pogo-style pins, or any pin style that is compatible with the mating JTAG connector of the recovery device.

Figure 3:
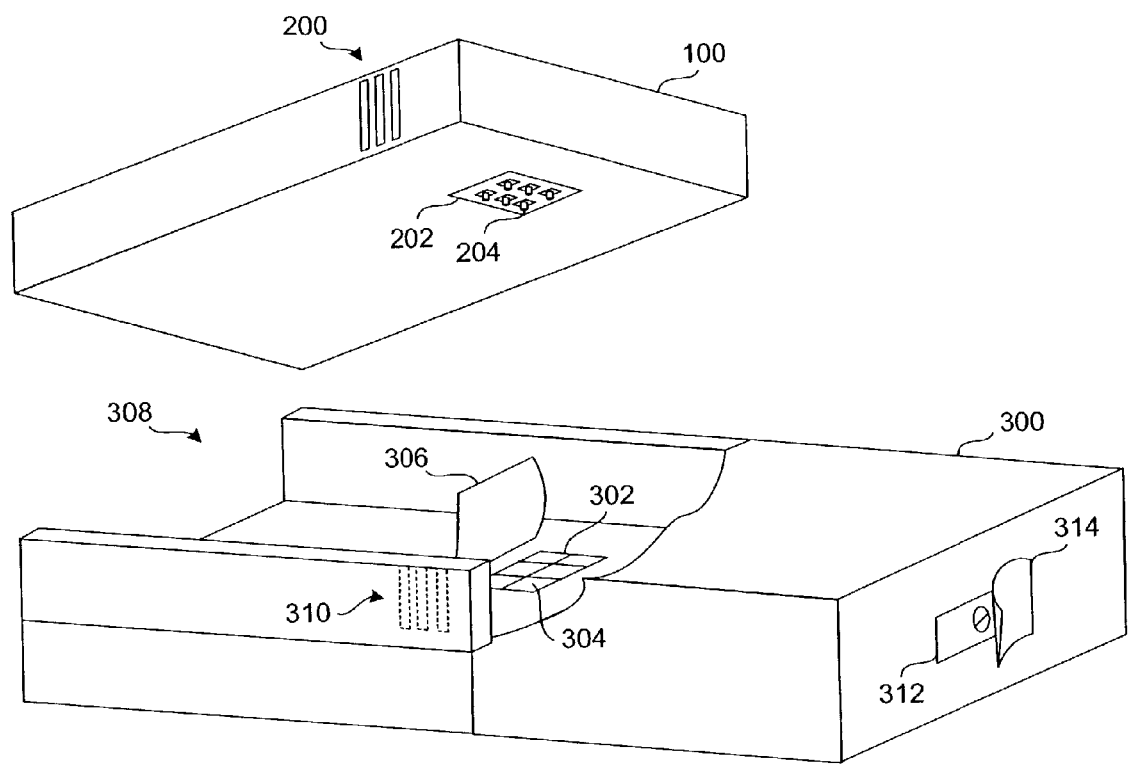
FIG. 3 illustrates an isometric of a recoverable device into which the module fits.

Referring now to FIG. 3, there is illustrated an isometric of a recoverable computing device 300 into which the module 100 fits. In this particular embodiment, the module JTAG connector 202 of the module 100 mates with a device JTAG connector 302 (also called the JTAG port or boundary-scan port) constructed in a port opening of the unopened housing and hidden underneath a label (or seal) 306 inside a battery well 308 of the recoverable device 300. In order to gain access to the JTAG circuits for updating or recovering the flash memory contents, the existing standard battery pack (not shown) is removed. The label 306 is then peeled back to expose access contacts 304 of the JTAG port connector 302 to the special disaster recovery module 100 that could, but is not required to, mate to the structure of the battery well 308. Thus the housing of the computing device does not need to be opened. The JTAG port connector 302 extends through the module housing exposing the access contacts 304. It is appreciated that the module 100, when conforming to the battery well structure 308, could also be adapted to provide battery power to the recoverable device 300 via the battery contacts 200 to mating device battery contacts 310 when properly seated into the battery compartment 308.

Alternatively, the device JTAG connector 302 may be concealed or made relatively inaccessible to the device owner by way of a screw-down hatch or cover 312 located outside of the battery well 308, which also may then be further concealed under a label (or seal) 314.

Figure 4:
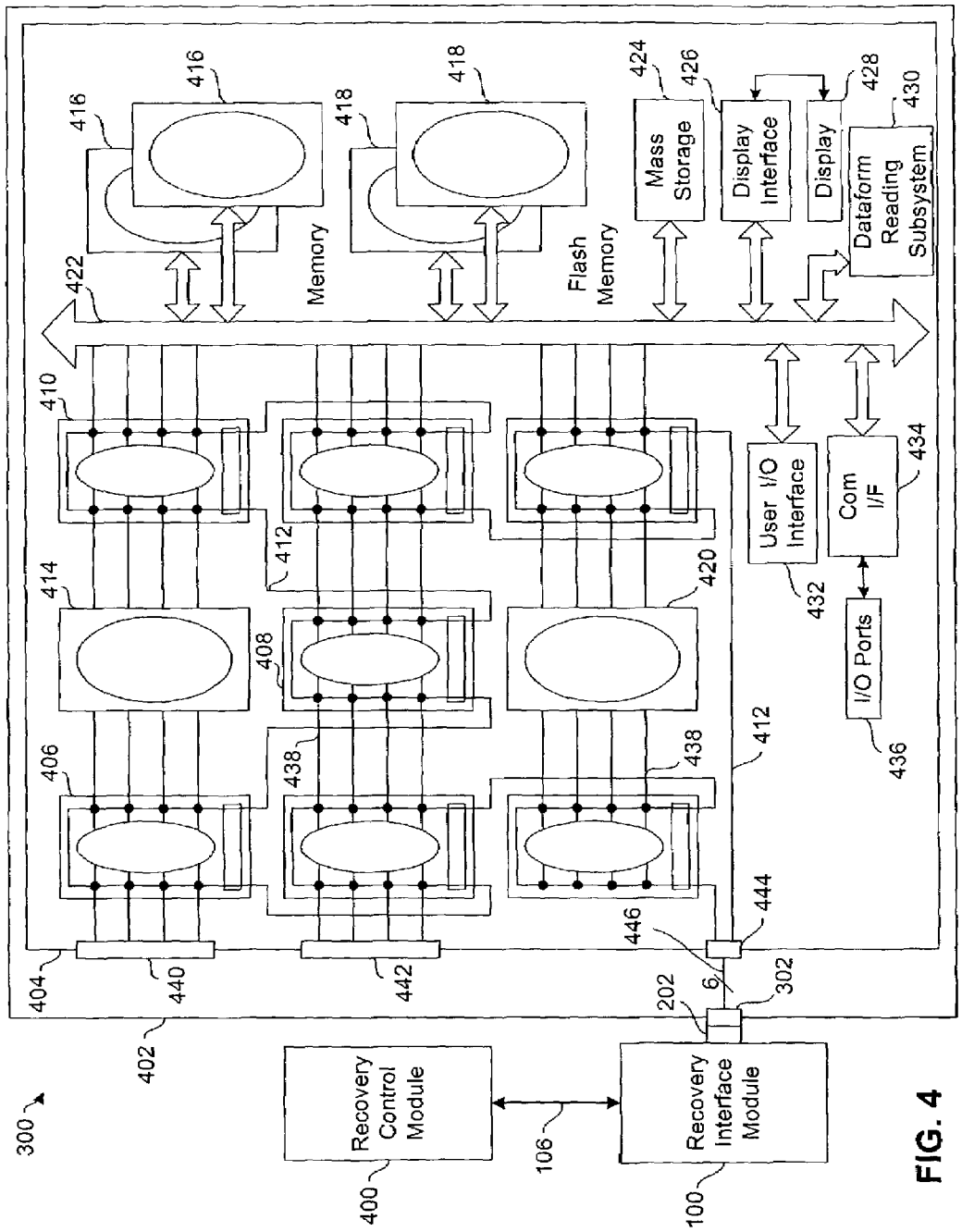
FIG. 4 illustrates a system block diagram comprising typical board of the computing device with boundary-scan components, the recovery module, and an external recovery control module.

Referring now to FIG. 4, there is illustrated a system block diagram comprising typical board of the computing device 300 with boundary-scan components, the recovery module 100, and an external recovery control module 400. The computing device 300 includes a housing 402 that encloses a system board 404. The system board 404 manufactured with boundary-scan devices, includes the following main components: one or more boundary-scan CPLDs 406, one or more FPGAs 408, and one or more processors 410 daisy-chained via the boundary-scan path 412. There are also included non-boundary-scan components 414 (also denoted as clusters), a first type of memory component 416, and a second type of memory component, e.g., flash memory 418. Other devices such as series resistors or buffers are grouped under a block called transparent components 420. The device 300 utilizes a system bus 422 over which most, if not all, of the internal components of the computing device 300 communicate signals and data.

The device 300 can comprise a number of other components, including but not limited to: a mass storage memory 424 for storing large amounts of data and/or computer executable instructions, and that communicates over the bus 422; a display interface 426 for interfacing a display 428 to one or more of the system processing devices via the bus 422 to provide a visual interface to the user; a dataform reading subsystem 430 (e.g., an optical scanner for reading bar codes, a magnetic reader for reading magnetic dataforms, an RF system for reading a transponder, . . . ) and communicating such dataform information over the bus 422; a user I/O interface 432 such as a keyboard, keypad, or other conventional user I/O mechanisms via which the user enters information to the bus 422; and, a communication interface 434 for communicating signals and data from the bus 422 to one or more ports 436 that facilitate external port communication utilizing architectures such as USB (Universal Serial Bus), IEEE 1394, CardBus, PCMCIA, etc.

The chained boundary-scan devices (406, 408, and 410) interconnected by the boundary-scan bus 412 of the system board 404 can also receive additional data I/O via internal edge-connector ports (440 and 442) over internal interconnect lines 438. The internal interconnect lines 438 also eventually connect to the bus 422. Note that the cluster devices 414 and transparent devices 420 can also be interrogated along with the other devices by imposing and analyzing data on devices on either side thereof.

The boundary-scan bus 412 is made internally accessible from the system board 404 via a system board JTAG port 444. The boundary-scan bus 412 is then extended to the housing 402 to the battery well connector 302. This can be accomplished by flexible circuit or cable 446 having suitable bandwidth and power capabilities, or even by foregoing the cable 446 such that the port 444 is directly interfaceable to the port 204.

Once the well connector 302 (or port 444 where made directly accessible) is uncovered, the recovery module 100 can be inserted into the battery well 308 such that well connector 302 can mate with the module connector 204. The recovery control module 400 then connects to the recovery module 100 via the cable 106 to couple power thereto, if needed, and communicate data and signals therebetween. It is appreciated that the control module 400 and interface module 100 can be combined into a single unit.

The disaster recovery data communicated to the flash memory 418 includes an updated version of the boot loader routine instructions that were corrupted. The updated version is communicated to overwrite the corrupted version currently existing in the flash memory 418. Note that the programmable boundary-scan devices (406, 408, and 410) can also be reprogrammed across the boundary-scan bus via the port 302. Such programmable devices (406, 408, and 410) may have associated therewith an internal memory that stores the programmable instructions for reprogramming of the devices (406, 408, and 410).

The nature of the computing device 300 can include a wide variety of such devices, in that an enormous number of electronic devices now include a processor of some sort, and which processors are typically designed with the boundary-scan architecture for efficient and reliable production testing before the consumer receives the device. Thus the computing device 300 includes, but is not limited to, cellular telephones, pagers, portable computers, PDAs, scanning devices, etc., and virtually any device including the boundary-scan architecture. All that needs to be done is to provide external access to the boundary-scan bus 412 through the housing port 302.

Figure 5:
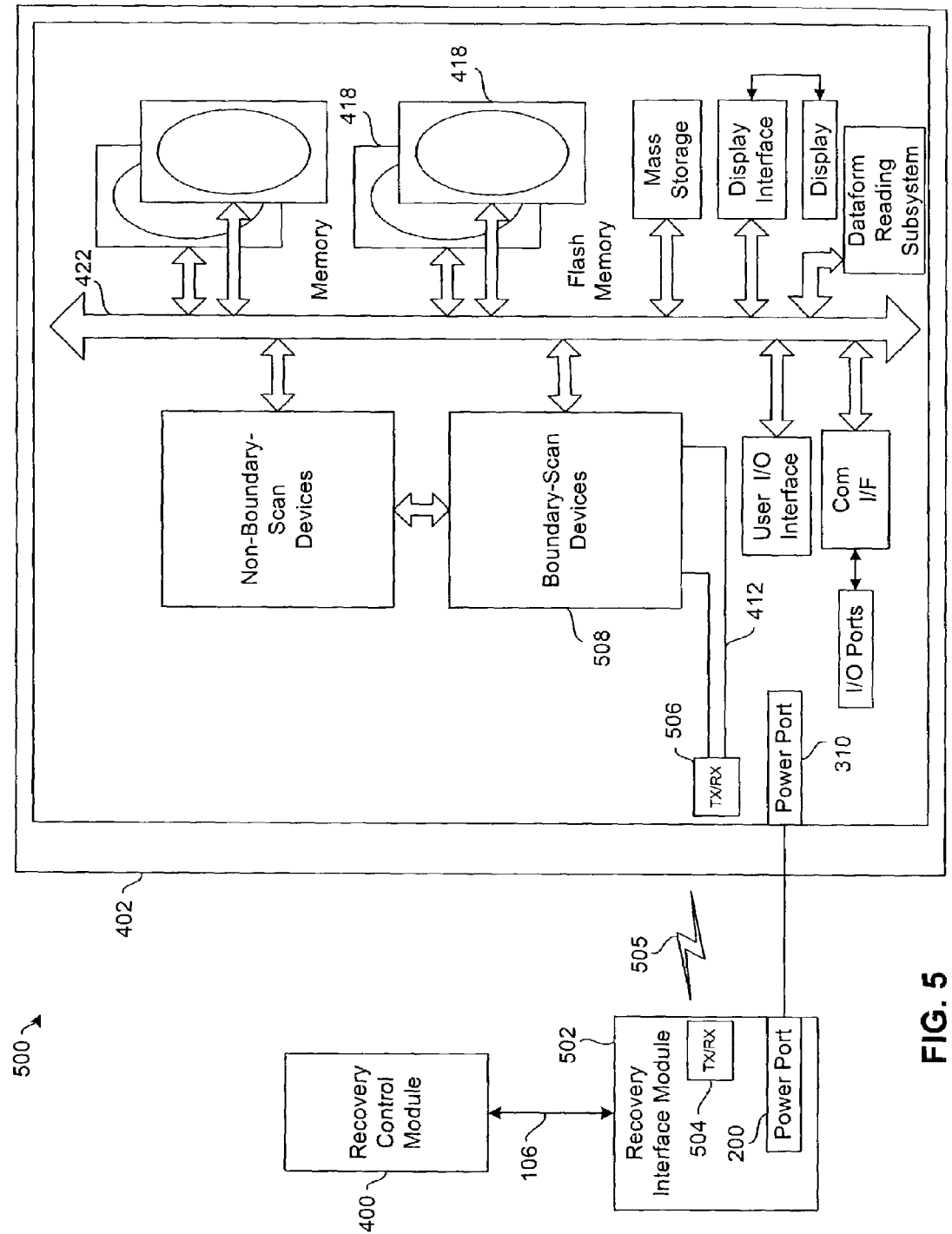
FIG. 5 illustrates a system block diagram of a boundary-scan system comprising a wireless boundary-scan bus connection.

Referring now to FIG. 5, there is illustrated a system block diagram of a boundary-scan system 500 comprising a wireless boundary-scan bus connection. The primary purpose of the labels (306 and 314) and/or the cover 312 is to discourage access to the JTAG or boundary-scan port 302 by the device owner through concealment techniques. In furtherance thereof, numerous other techniques could be made available to preclude access by the device owner to the internal boundary-scan architecture. In this particular embodiment, a recovery interface module 502 is adapted to include a wireless transceiver 504 communicating signals and data over a wireless link 505 to a compatible wireless transceiver 506 internal to the computing device housing 402.

The internal wireless transceiver 506 terminates to the boundary-scan bus 412 such that the data and signals can be communicated over the bus 412 to boundary scan devices 508. Thus physical JTAG ports 302 and/or 444 of FIG. 4 are no longer needed. The bandwidth power of the wireless transceiver pair (504 and 506) could be adjusted such that the recovery interface module 502 must be brought into close proximity to the housing 402 to ensure reliable communication therebetween. Any DC power that may still be required for powering the computing device can be provided through the battery ports (200 and 310), when the interface module 502 is designed to be utilized in the computing device battery well 308. Otherwise, a separate power connection can be provided between the computing device and the interface module 502. Thus the disaster recovery signals, including, but not limited to, the updated boot loader routine, are wirelessly communicated from the interface module 502 through the wireless link 505 to the boundary-scan bus 412, and ultimately across the system bus 422 to the flash memory 418. The computing device may include all or some number of components further described in detail in FIG. 4.

Figure 6A:
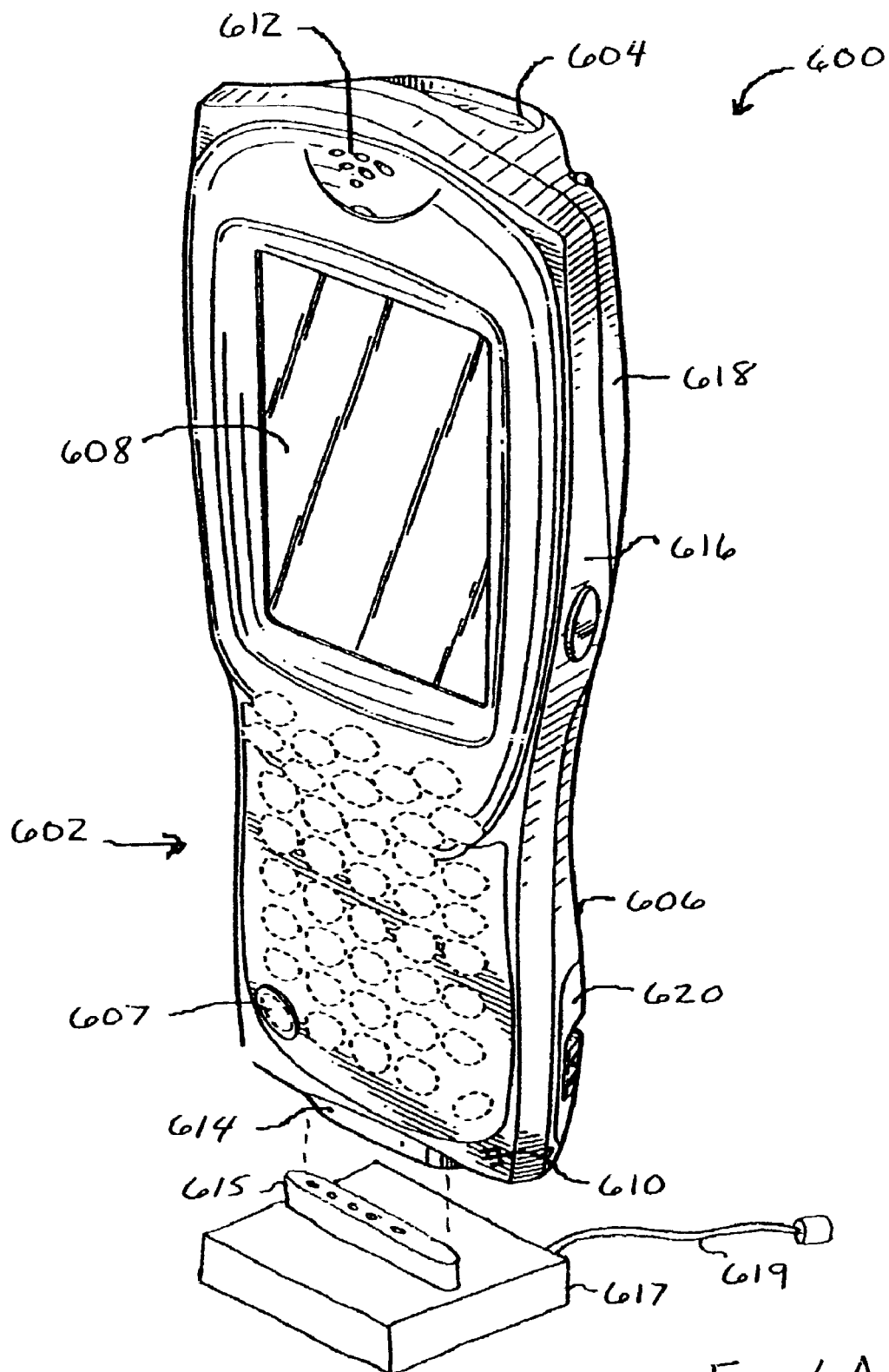
FIGS. 6A and 6B illustrate front and rear views of a portable terminal device in accordance with the subject invention.
Figure 6B:
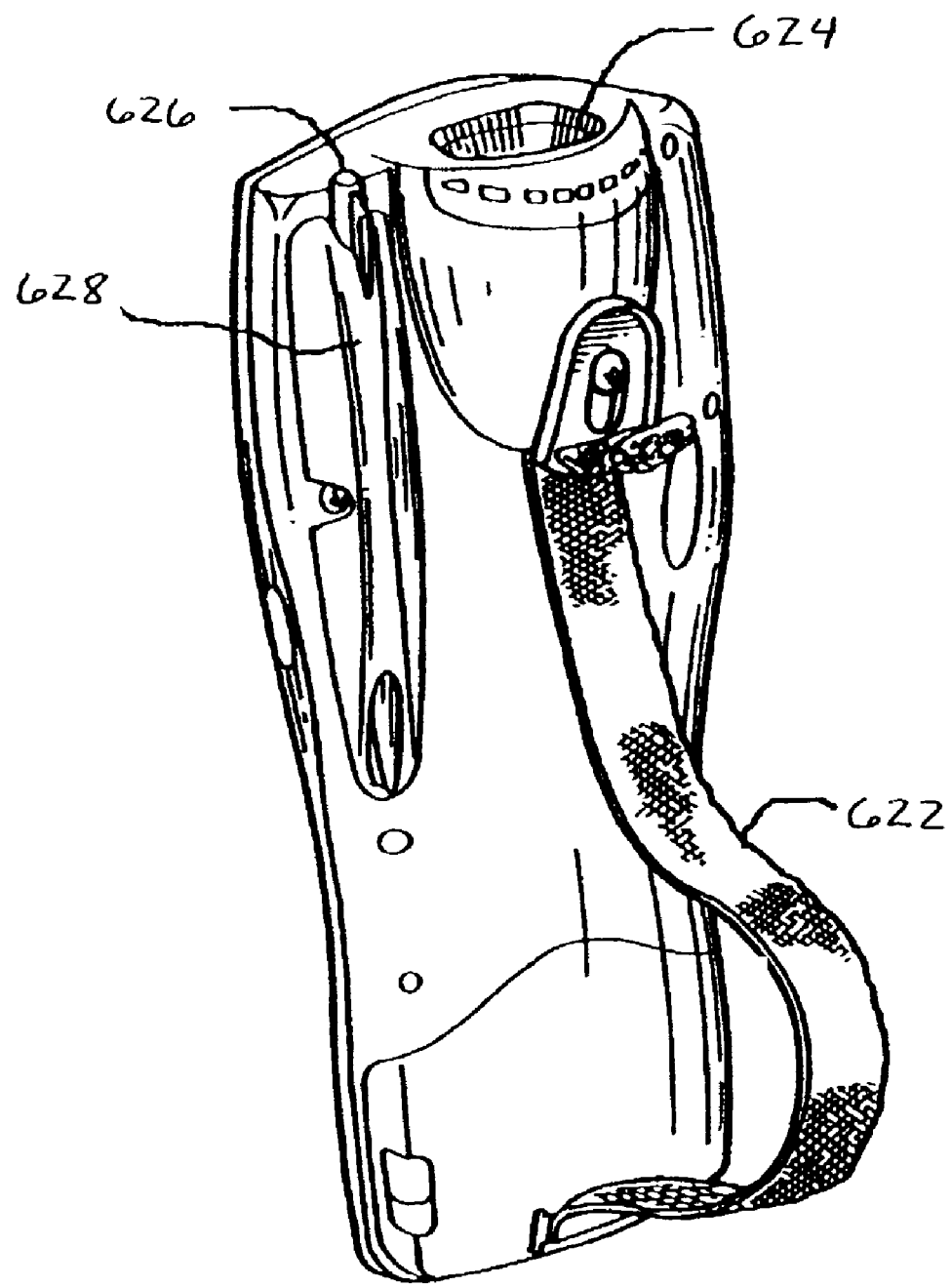

Referring now to FIGS. 6A and 6B, there is illustrated front and rear views respectively of a portable terminal device 600 adapted to include the architecture of the subject invention. FIG. 6A is a pictorial representation of the front view thereof, and FIG. 6B is a pictorial representation of the rear view. In this particular example, the portable electronic device 600 is a hand-held terminal used in a wireless communication network for tracking inventory, scanning and storing data, etc. The user may manually interface with the device 600 via a keypad 602, automatically input data by reading a dataform (not shown) in the format of, e.g., bar code, image, magnetic media with a dataform reading component 604, the dataform reading component 604, including, e.g., a bar code scanner/imaging apparatus or magnetic reader, etc., the operation of all which can occur independent of the device 600 being in operative wired/wireless communication with a network, e.g., a LAN or WAN. When the device 600 does not include wireless communication capability, e.g., an RF means, to provide for real time communications of data to the LAN/WAN, the data is stored in memory within the device 600. The memory can take the form non-volatile storage such as a micro-drive disk storage unit, RAM memory, flash memory, etc. When the device 600 is connected to a LAN/WAN, the stored data can be transmitted thereacross to a network storage node, e.g., a network client or server computer (not shown). It is appreciated that the portable device 600 can also be any other type of device that is portable in nature, and having electronic circuitry therein in accordance with the present invention. For example, the portable device could be a laptop computer, notebook computer, a Personal Data Assistant, cellular telephone, pager, any of which employs an onboard power source, such as batteries.

The device 600 includes, but is not limited to, the following components: a housing 606 for providing a ruggedized enclosure in which the device hardware and software are contained; a power button 607 turning the device on and off; a display 608 for displaying information to a user, and where the display 608 is an interactive interface device such as a touch screen display, allowing the user to interact manually to input information and/or operational commands; the keypad 602 including a set of user interface keys for facilitating to input of information and/or operational commands by the user, the keypad 602 including full alphanumeric capability, function keys, control keys, etc.; the dataform reading device 604, e.g., bar code scanner, imager, magnetic medium reader, etc.; a microphone 610 for receiving audio input; a speaker for providing audio output to the user, whether rudimentary beeps or modulated verbal signals; and, one or more communication ports, either provided separately through the housing 606, and/or via contacts 614 incorporating the disclosed contact architecture.

The contacts 614 mate to base contacts 615 of a base station 617, or other suitable accessory. The base station 617 provides charging power to batteries of the device 600, and power to operate the device 600 while in the station 617, if adapted to do so. The station 617 includes a cable 619 that accommodates both power and communications. For example, the cable 619 can be a wired network connection such that data may uploaded/downloaded between a network resource and the device 600. It is appreciated that other arrangements of the disclosed contact architecture thereof can be incorporated therein. The device 600 can include a lighting element such as an LED that is illuminated to signal whether or not the dataform has been successfully read.

The housing 606 is an elongated enclosure of a size and structure that includes contours so as to fit conveniently into the open palm of the user. The housing 606 may be comprised of a number of mating shell portions such as, for example, a front shell 616 and rear shell 618, as well as a battery pack lid 620.

In FIG. 6B, the housing 606 is illustrated to include a hand strap 622 for user comfort, and to aid the user in retaining the device 600 in his or her hand. The device 600 also includes a window 624 through which the dataform reader 604 is able to read the dataform of a label or object presented for reading. To facilitate keypad and/or touch screen use by the user, a pen 626 is provided in a pen holder 628.

Of course, other communication interface technologies may be utilized with the disclosed connector system. Popular serial and parallel communication technologies may be utilized, e.g., I$^2$C (Inter-IC bus), RS-232, USB (Universal Serial Bus), IEEE 1394 (also known as FireWire™).

It is appreciated that the disclosed architecture is also applicable to non-boundary scan implementations. A computer (portable or non-portable) utilizing a dedicated transceiver wireless communication interface can obtain the disaster recovery benefits by communicating the software through the wireless transceiver interface to the central processing unit (CPU). The CPU than executes the instructions necessary to upload the recovery software and/or updates to the system firmware. The transceiver circuit can be disposed on the system bus, or any other connection providing access to the CPU, and located inside the computer case proximate to the case shell so that transmission power can be minimized to that required for reliable communication from an external controller within a distance of several inches or less of the case shell. In such an implementation where port access is mechanically inaccessible through the case shell, the location of the transceiver circuit can be inconspicuously marked on the outside of the computer case to indicate to the technician the approximate location of the communication circuit. The technician will then place the external controller unit near the mark sufficient to establish reliable communications, and commence communication of the instructions with the CPU. In a portable computer scenario, power can be supplied by either the battery pack or line source, while in non-portable scenario, power can be provided by the typical line power source. The wireless transceiver can also be the interface circuit of conventional wireless network interface cards, e.g., CardBus and legacy PCMCIA (Personal Computer Memory Card International Association) devices. Additionally, the communication pathway can be through standard ports that include, but are not limited to, the serial ports, e.g., the COM ports, USB ports, and IEEE1394 port. Communication can also be via a parallel port.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
   a bar code scanner that facilitates collection of scanned data;
   a processor that analyzes at least a subset of the scanned data;
   a memory having program instructions stored thereon, the processor processing the program instructions in connection with at least one boundary-scan processing device operatively disposed on a boundary-scan bus; and contacts, at least a portion of which are accessible external to a housing of the computing device, the contacts facilitating operative coupling to the boundary-scan bus to communicate an updated version of the program instructions over the boundary-scan bus to the memory when the program instructions become corrupted.

2. The device of claim 1, further comprising an interface recovery module that is external to the housing of the computing device and communicates the updated version of the program instructions.

3. The device of claim 2, the interface recovery module is releasably disposed within a battery well of the computing device.

4. The device of claim 3, the interface recovery module provides power to the computing device.

5. The device of claim 1, the boundary-scan bus is accessed through a boundary-scan port in the housing.

6. The device of claim 5, the boundary-scan port is concealed by at least one of a label and a cover to conceal the location of the port on the computing device.

7. The device of claim 1, the memory is a flash memory that receives the updated version of the program instructions.

8. The device of claim 1, the memory is associated with the at least one boundary-scan device such that the updated version of the instructions is communicated across the boundary-scan bus to reprogram the at least one boundary-scan device.

9. The device of claim 1, the program instructions include a boot loader routine stored in the memory.

10. The device of claim 1, further comprising a wireless communication port operatively connected to the boundary-scan bus for facilitating wireless communications of the program instructions to the device.

11. The device of claim 10, the wireless port is mechanically inaccessible through the housing of the device.

12. A method of updating corrupted instructions in a computing device, comprising:
receiving a computing device that includes a bar code scanner;
in response to a boot loader routine stored in a memory of the device becoming corrupted, accessing a boundary-scan bus through contacts integral with a housing of the device to communicate an updated version of the boot loader routine thereacross for storing in the memory.

13. The method of claim 12, further comprising providing an external interface recovery module that communicates the updated version of the boot loader routine.

14. The method of claim 12, the boundary-scan bus is accessed through a boundary-scan port in the housing.

15. The method of claim 12, the memory is a flash memory that receives the updated version of the boot loader routine.

16. A disaster recovery apparatus for a computing device, comprising:
a bar code reader;
a memory internal to the computing device for storing instructions;
at least one boundary-scan processing device operatively disposed on a boundary-scan bus for processing the instructions; and
a housing for enclosing the memory and at least one boundary-scan device, the boundary-scan bus accessed through the housing to communicate an updated version of the instructions thereacross for storing in the memory.

17. The apparatus of claim 16, further comprising an external interface recovery module that communicates the updated version of the instructions.

18. The apparatus of claim 16, the instructions include a boot loader routine stored in the memory, which memory is a flash memory.

19. A computing device, comprising:
means for scanning and collecting bar code data;
means for storing program instructions in flash memory; and
means to facilitate external accessing of the program instructions via a boundary-scan bus to communicate an updated version of the instructions via the boundary-scan bus when the instructions become corrupted.

20. The device of claim 19, the means to facilitate external accessing of the program instructions comprise contacts electrically coupled to the means for storing program instructions.

21. A computing device, comprising:
a bar code reader to facilitate collecting data;
a processor tat analyzes at least a subset of the collected data;
a memory having program instructions stored thereon, the processor processing the instructions in connection with at least one boundary-scan processing device operatively disposed on a boundary-scan bus; and
a port operatively disposed on the boundary-scan bus in communication with the processor for facilitating communication of an updated version of the program instructions when the program instructions become corrupted.

22. The device of claim 21, the port is a wireless communications port.

23. The device of claim 21, the port is a wireless communications port mechanically inaccessible through a housing of the device.

24. A method of updating corrupted instructions in a computing device, comprising:
receiving a computing device comprising at least a bar code scanner; and
in response to a boot loader routine stored in a memory of the device becoming corrupted, accessing a bus through a port of the device to communicate an updated version of the boot loader routine thereacross for storing in the memory.

25. The method of claim 24, further comprising providing an external interface recovery module adapted for communicating the updated version of the boot loader routine.

26. The method of claim 24, the bus at least one of a boundary-scan bus and a system bus accessed through the housing via the port, which is a wireless communication port.

27. The method of claim 26, the port a mechanically inaccessible through the housing.

28. The method of claim 24, the memory is a flash memory that receives the updated version of the boot loader routine.

* * * * *